(12) United States Patent
Imaizumi et al.

(10) Patent No.: US 10,978,986 B2
(45) Date of Patent: Apr. 13, 2021

(54) ELECTRIC POWER STEERING DEVICE

(71) Applicant: Mitsubishi Electric Corporation, Tokyo (JP)

(72) Inventors: Seiichi Imaizumi, Hyogo (JP); Susumu Zeniya, Tokyo (JP); Yuji Takatsuka, Hyogo (JP); Yasushi Takemoto, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 15/542,701

(22) PCT Filed: May 8, 2015

(86) PCT No.: PCT/JP2015/063277
§ 371 (c)(1),
(2) Date: Jul. 11, 2017

(87) PCT Pub. No.: WO2016/181435
PCT Pub. Date: Nov. 17, 2016

(65) Prior Publication Data
US 2018/0001924 A1    Jan. 4, 2018

(51) Int. Cl.
*H02P 29/00*       (2016.01)
*B62D 5/04*        (2006.01)
*B60R 16/03*       (2006.01)

(52) U.S. Cl.
CPC ............ *H02P 29/00* (2013.01); *B62D 5/0457* (2013.01); *B62D 5/0481* (2013.01); *B60R 16/03* (2013.01)

(58) Field of Classification Search
CPC .. B62D 5/0493; B62D 5/0481; B62D 5/0457; B62D 6/10; B62D 5/0463; H02P 29/032; B60R 16/03
See application file for complete search history.

(56) References Cited

U.S. PATENT DOCUMENTS

| 8,140,280 B2 * | 3/2012 | Kasai | B62D 5/0481 |
| | | | 702/63 |
| 2010/0004814 A1 * | 1/2010 | Nagata | F02D 41/22 |
| | | | 701/31.4 |

FOREIGN PATENT DOCUMENTS

EP    2 161 179 A1    3/2010
JP    2008-290524 A    12/2008

OTHER PUBLICATIONS

International Search Report of PCT/JP2015/063277 dated Jul. 7, 2015.
Communication dated May 22, 2018, from the Japanese Patent Office in counterpart application No. 2017-517460.

* cited by examiner

*Primary Examiner* — Christian Chace
*Assistant Examiner* — Jordan S Fei
(74) *Attorney, Agent, or Firm* — Sughrue Mion, PLLC; Richard C. Turner

(57) ABSTRACT

A shortening of an initial diagnosis time is achieved, even after an elapse of a predetermined delay time from an ignition switch being switched to an off-state. After the ignition switch is switched to an off-state after an operation of a control device, which drives an electric motor that applies steering assistance force to a steering system, diagnosis of a power supply circuit that supplies power to the control device is carried out, and a diagnosis item to be implemented in a succeeding initial diagnosis is determined based on a result of the diagnosis.

3 Claims, 3 Drawing Sheets

ELECTRIC POWER STEERING DEVICE

CROSS REFERENCE TO RELATED APPLICATIONS

This application is a National Stage of International Application No. PCT/JP2015/063277 filed May 8, 2015, the contents of which are incorporated herein by reference in its entirety.

BACKGROUND OF THE INVENTION

Field of the Invention

The present invention relates to an electric power steering device including self-diagnosis means that carries out an initial diagnosis, including a diagnosis of power interrupting means, when starting a start-up, and when a result of the initial diagnosis is that there is no impediment to operation, causes control to be implemented with the power interrupting means in an energized state.

Description of the Related Art

As this kind of electric power steering device, there is an electric power steering device such that when switching an ignition switch to an on-state again before an elapse of a preset delay time from the ignition switch being turned off, a start-up is caused without a diagnosis of power interrupting means being carried out so as to shorten initial diagnosis time, provided that a previous diagnosis result is normal, thereby preventing an assisted start delay, as disclosed in JP-A-2008-290524 (Patent Document 1).

Patent Document 1: JP-A-2008-290524

However, the kind of existing technology disclosed in Patent Document 1 is such that when a power supply relay and motor relay are turned off, and the ignition switch switched to an on-state again, after a predetermined delay time elapses from the ignition switch being switched to an off-state, an initial diagnosis including a power interruption diagnosis is carried out. Because of this, there is a problem in that an initial diagnosis time cannot be shortened when the ignition switch is switched to an on-state after the delay time elapses.

SUMMARY OF THE INVENTION

Therefore, an object of the invention is to provide an electric power steering device such that a shortening of an initial diagnosis time can be achieved, even after an elapse of a predetermined delay time from an ignition switch being switched to an off-state.

In order to achieve the heretofore described object, an electric power steering device according to the invention includes a steering assistance mechanism including an electric motor that applies a steering assistance force to a steering system, and a control device that drives the electric motor, and is characterized in that the control device includes an arithmetic processing device that carries out an initial diagnosis including a diagnosis of power interruption means of the control device at least when an ignition switch is switched to an on-state, causes the control device to operate when a result of the initial diagnosis is that there is no impediment to an operation of the control device, carries out a diagnosis of the power interruption means after the ignition switch is switched to an off-state after the control device operates, and determines a diagnosis item to be implemented in a succeeding initial diagnosis based on a result of the diagnosis.

Also, the electric power steering device according to the invention is characterized in that the arithmetic processing device carries out a diagnosis of the power interruption means after the ignition switch is switched to an off-state after the control device operates, and when a result of diagnosing the power interruption means is normal when the ignition switch is switched to an on-state again after stopping steering assistance control and stopping a system, implements an initial diagnosis for diagnosis items other than a diagnosis item accompanying continuity and an interrupting action, which is a diagnosis of the power interruption means.

According to the invention, an initial diagnosis is carried out by self-diagnosis means every time an operation of a control device starts, but a diagnosis item when carrying out the diagnosis is determined based on a result of a diagnosis after an ignition switch is switched to an off-state after the previous operation of the control device, because of which only a necessary initial diagnosis is carried out, and an initial diagnosis time can be shortened.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

Figure 1:
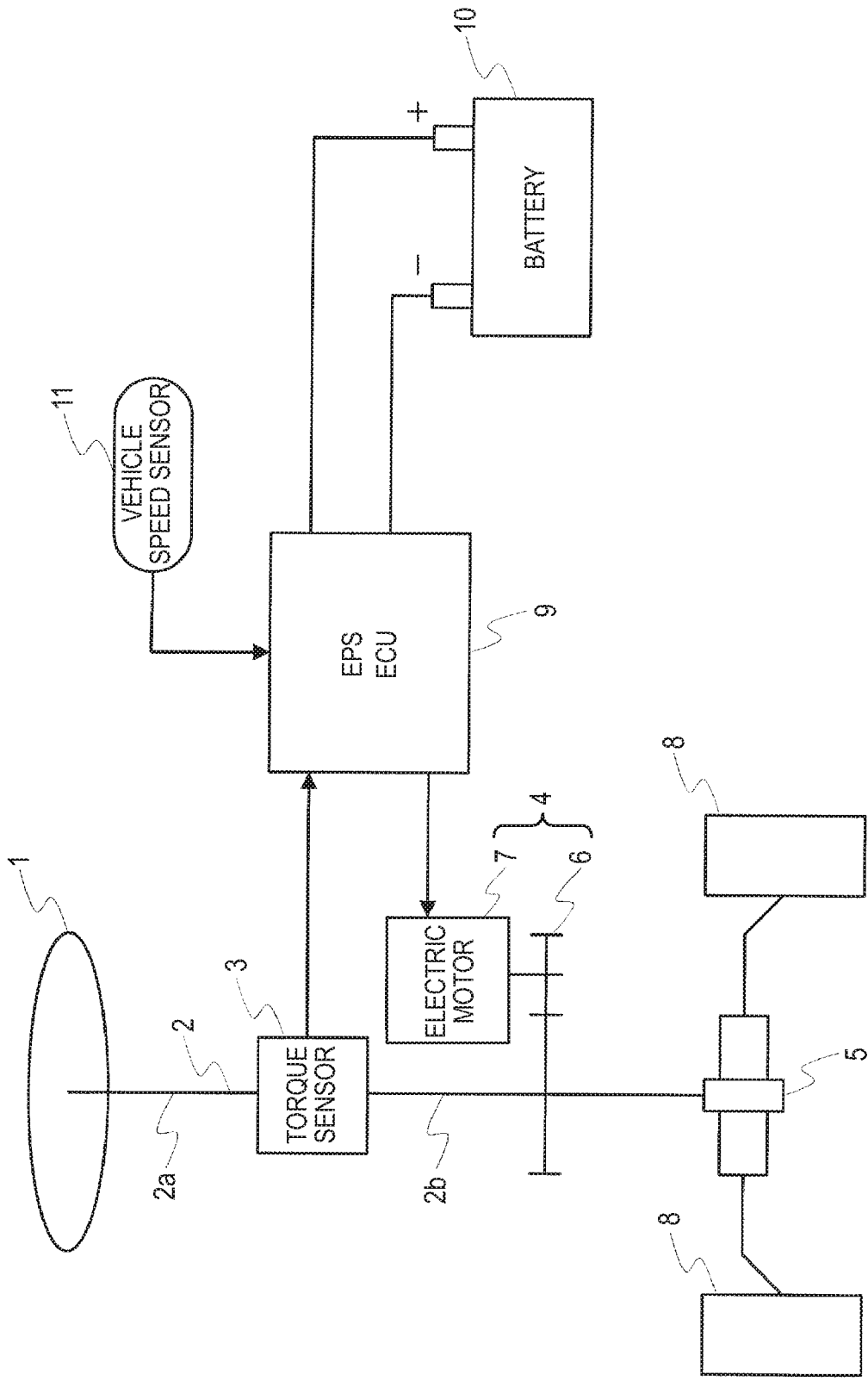
FIG. 1 is a diagram showing a configuration of an electric power steering device according to a first embodiment of the invention.

Hereafter, referring to the drawings, a preferred embodiment of an electric power steering device according to the invention will be described.

First Embodiment

FIG. 1 is a configuration diagram of an electric power steering device according to a first embodiment of the invention. In FIG. 1, reference sign 1 indicates a steering wheel, and steering force applied to the steering wheel 1 by a driver is transmitted to a steering shaft 2 having an input shaft 2a and an output shaft 2b, The steering shaft 2 is such that one end portion of the input shaft 2a is coupled to the steering wheel 1, and another end portion is coupled to one end portion of the output shaft 2b via a torque sensor 3 acting as steering torque detection means. Further, another end portion of the output shaft 2b is coupled to a steering assistance mechanism 4, and coupled to a rack and pinion mechanism 5.

The steering assistance mechanism 4 includes a reduction gear 6 coupled to the output shaft 2b, and an electric motor 7, coupled to the reduction gear 6, that generates steering assistance force. The torque sensor 3 detects steering torque applied to the steering wheel 1 and transmitted to the input shaft 2a, and the rack and pinion mechanism 5 transmits rotational force of the steering shaft 2 to a front wheel 8.

Also, the electric power steering device according to the first embodiment includes a control device 9 that carries out electric power steering control (hereafter referred to as EPS control), and power is supplied to the control device 9 from a battery 10. Vehicle speed detected by a vehicle speed sensor 11 and steering torque detected by the torque sensor 3 are input into the control device 9, as will be described hereafter, and a control signal for the electric motor 7 is output.

Next, the control device 9 will be described in detail.

Figure 2:
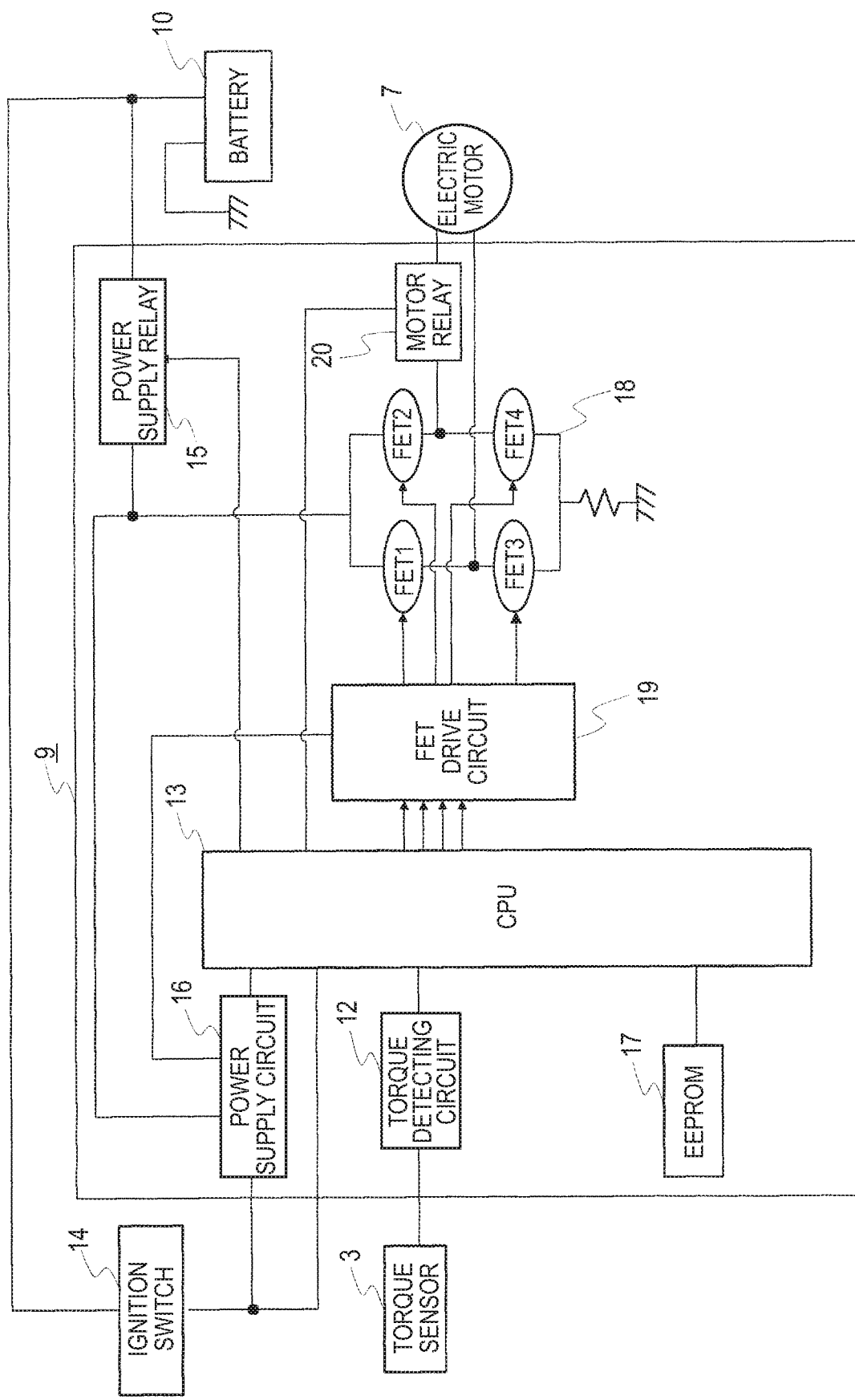
FIG. 2 is a diagram showing a configuration of a control device in the electric power steering device according to the first embodiment of the invention.

The control device 9 includes a torque detecting circuit 12, as shown in FIG. 2. The torque detecting circuit 12 is an interface circuit into which a steering torque detection signal output from the torque sensor 3 is input, and is for inputting the steering torque detection signal into an arithmetic processing device 13.

Also, the control device 9 has the arithmetic processing device 13 configured of, for example, a CPU, wherein the arithmetic processing device 13 carries out a predetermined operation based on a detected torque value output from the torque detecting circuit 12, and outputs a motor drive current. Control power formed in a power supply circuit 16 having two power supply systems, those being a power supply system wherein power from the battery 10 is supplied via an ignition switch 14 and a power supply system wherein power is supplied from an output side of a power supply relay 15 to be described hereafter, is supplied to the arithmetic processing device 13. Also, a non-volatile memory 17 configured of, for example, an EEPROM, which stores a result detected by a self-diagnosis process to be described hereafter, is connected to the arithmetic processing device 13.

The arithmetic processing device 13 outputs a calculated motor drive current to a motor drive circuit, for example, an FET drive circuit 19 that controls field effect transistors FET 1 to FET 4 configuring an H-bridge circuit 18, thereby driving the electric motor 7.

The H-bridge circuit 18 has a series circuit wherein the two field effect transistors FET 1 and FET 3 are connected in series and, parallel to this series circuit, a series circuit wherein the two field effect transistors FET 2 and FET 4 are connected in series. Further, the electric motor 7 is connected via a motor relay 20 between a connection point of the field effect transistors FET 1 and FET 3 and a connection point of the field effect transistors FET 2 and FET 4, and one connection point of the two series circuits is connected via the power supply relay 15 to the battery 10.

Figure 3:
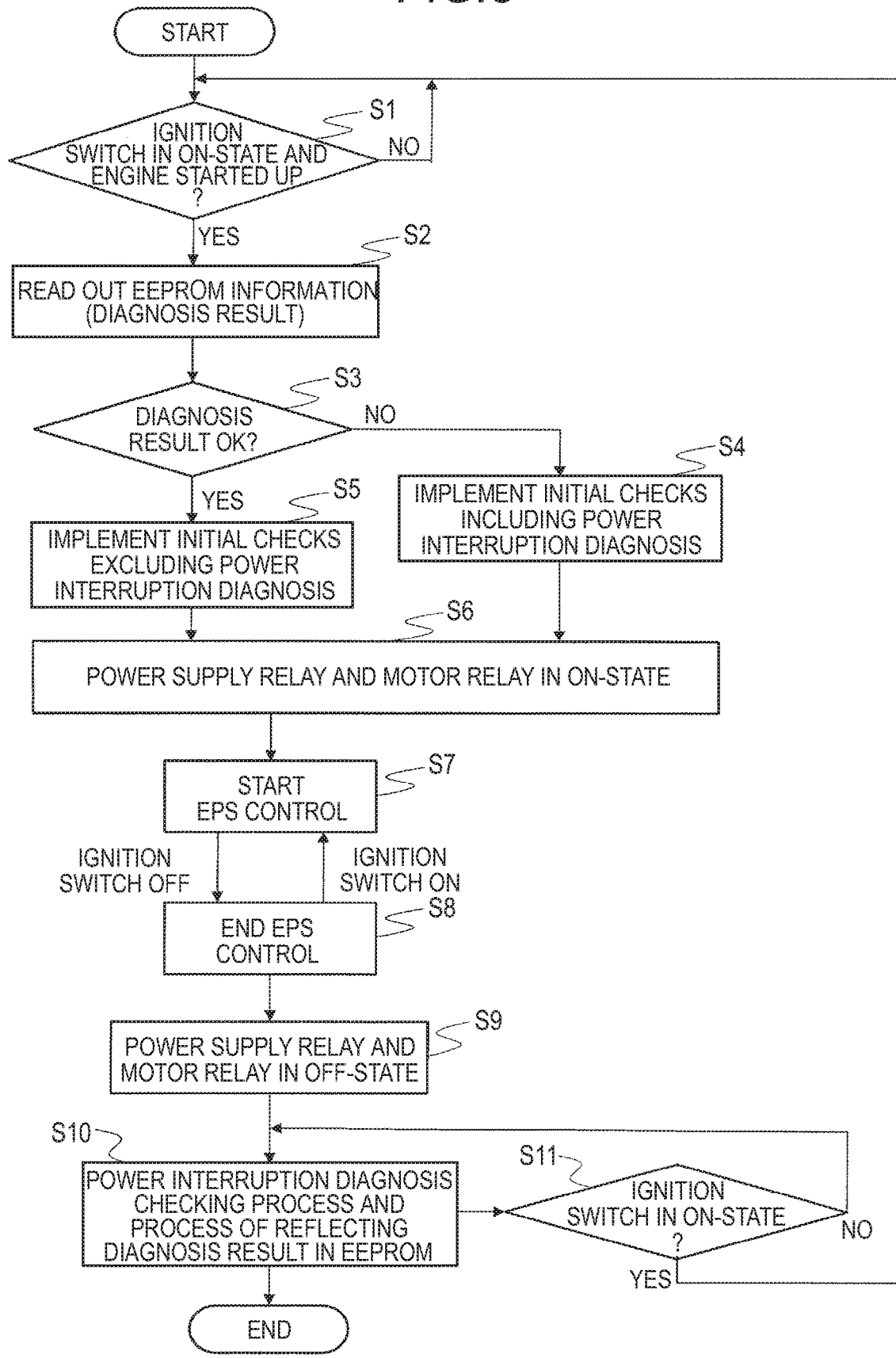
FIG. 3 is a flowchart showing one example of a self-diagnosis process procedure executed in an arithmetic processing device of the control device shown in FIG. 2.

Also, the arithmetic processing device 13 executes a self-diagnosis process shown in FIG. 3. FIG. 3 is a flowchart showing one example of a self-diagnosis process procedure executed in the arithmetic processing device 13.

Execution of the self-diagnosis process of the arithmetic processing device 13 is started when power is supplied from the power supply circuit 16 to the arithmetic processing device 13 with the ignition switch 14 in an on-state, and an engine speed reaches a predetermined speed or greater (for example, an engine speed equal to or greater than 1,000 rpm) (step S1), and firstly, a result of a power interruption diagnosis, to be described hereafter, stored in the non-volatile memory 17 is read out (step S2), and the process shifts to step S3.

An evaluation of the diagnosis result is carried out in step S3, and when the diagnosis result is normal, the process shifts to step S5, and initial checks excluding a power interruption diagnosis are implemented. When the diagnosis result is abnormal, the process shifts to step S4, and all initial checks including a power interruption diagnosis are implemented.

When results of all the initial checks are normal, the process shifts to step S6, the power supply relay 15 and motor relay 20 are switched to an on-state, and the process shifts to step S7.

In step S7, EPS control is started, a necessary motor drive current value is calculated in the arithmetic processing device 13 from a signal input from the torque sensor 3, and current is output to the H-bridge circuit 18 that drives the electric motor 7. When the ignition switch 14 is in an on-state, the EPS control is continued, and when the ignition switch 14 is turned off, the process shifts to step S8, and the EPS control ends.

When the ignition switch 14 is switched to an on-state again before a predetermined delay time elapses in step S8, the process shifts to step S7 again, and EPS control is started. Also, when the predetermined delay time elapses with the ignition switch 14 in an off-state in step S8, the process shifts to step S9, the power relay 15 and motor relay 20 are switched to an off-state, and the process shifts to step S10.

In step S10, for example, a process of checking a power interruption diagnosis of the power relay 15 and motor relay 20 is carried out, and a diagnosis result is stored in the non-volatile memory 17. When the ignition switch 14 is switched to an on-state during the power interruption diagnosis check in step S10 (step S11), the fact that there is an abnormality in the result of the power interruption diagnosis check is stored in the non-volatile memory 17, and the process shifts to step S1.

Also, when it is determined in step S10 that the diagnosis result is normal, the fact that the diagnosis result is normal is stored in the non-volatile memory 17, and the system is shut down, and when it is determined that the diagnosis result is abnormal, the fact that the diagnosis result is abnormal is stored in the non-volatile memory 17, and the system is shut down.

In this way, when the ignition switch 14 is switched to an on-state again after the process of step S10 ends, necessary initial checks only can be carried out based on the diagnosis result stored in the non-volatile memory 17 in step S10, and an initial check time can be shortened.

According to the electric power steering device according to the first embodiment, as heretofore described, initial diagnosis is carried out to include diagnosis of the steering assistance mechanism 4 including the electric motor 7 that applies steering assistance force to a steering system, the control device 9 that drives the electric motor 7, and the power supply circuit 16 that interrupts power to the control device 9 at least when the ignition switch 14 is in an on-state, the electric power steering device includes self-diagnosis means that causes the control device 9 to operate when a result of the initial diagnosis is that there is no impediment to an operation of the control device 9, and the self-diagnosis means carries out a diagnosis of the power supply circuit 16 after the ignition switch 14 is switched to an off-state after the control device 9 operates, and determines a diagnosis item to be implemented in a succeeding initial diagnosis based on a result of the diagnosis.

Consequently, although an initial diagnosis is carried out by the self-diagnosis means every time an operation of the control device 9 starts, a diagnosis item when carrying out the diagnosis is determined based on the result of a diagnosis after the ignition switch 14 is switched to an off-state after the previous operation of the control device 9, because of which only a necessary initial diagnosis is carried out, and the initial diagnosis time can be shortened.

Also, the self-diagnosis means carries out a diagnosis of the power supply circuit 16 after the ignition switch 14 is switched to an off-state after the control device 9 operates, and when a result of diagnosing the power supply circuit 16 is normal when the ignition switch 14 is switched to an on-state again after stopping steering assistance control and stopping the system, implements an initial diagnosis for diagnosis items other than a diagnosis item accompanying continuity and an interrupting action, which is a diagnosis of the power supply circuit 16.

Consequently, although an existing electric power steering device is such that a discharge circuit is provided in order to shorten the time for a power supply circuit diagnosis item, there is no longer a need to shorten diagnosis time for the power supply circuit 16 diagnosis item when the ignition switch 14 is switched to an off-state, because of which a discharge circuit is unnecessary, and cost can be reduced.

Although a description has been given of the first embodiment of the invention, the embodiment can be modified or abbreviated as appropriate without departing from the scope of the invention.

What is claimed is:

1. An electric power steering device, comprising:
   a steering assistance mechanism including an electric motor that applies a steering assistance force to a steering system; and
   a control device that drives the electric motor, wherein the control device includes a processor that:
      reads out a previous diagnosis result stored in a storage;
      carries out an initial diagnosis including a diagnosis of a power supply circuit, a power supply relay, and a motor relay when an ignition switch is switched to an on-state, in response to the previous diagnosis result being abnormal;
      in response to the previous diagnosis result being normal, carries out the initial diagnosis other than the diagnosis of the power supply circuit, the power supply relay, and the motor relay by skipping the diagnosis of the power supply circuit, the power supply relay, and the motor relay during the initial diagnosis, when the ignition switch is switched to the on-state and the power supply relay and the motor relay are in an off-state, regardless of whether a predetermined delay time has elapsed since the ignition switch is switched to the off-state;
      performs an electric power steering (EPS) control in a first time period while the ignition switch is in the on-state;
      carries out a diagnosis of the power supply circuit, the power supply relay, and the motor relay after the ignition switch is switched from the on-state to the off-state, in a second time period subsequent to the first time period; and
      determines a diagnosis item to be implemented in a succeeding initial diagnosis based on a result of the diagnosis of the power supply circuit, the power supply relay, and the motor relay.

2. The electric power steering device according to claim 1, wherein when a result of the diagnosis of the power supply circuit, the power supply relay, and the motor relay is normal when the ignition switch is switched to the on-state again after stopping steering assistance control, the processor performs the succeeding initial diagnosis without diagnosing the power supply circuit, the power supply relay, and the motor relay.

3. The electric power steering device according to claim 1, wherein
   when results of the initial diagnosis other than the diagnosis of the power supply circuit, the power supply relay, and the motor relay are normal, the processor switches the power supply replay and the motor relay to the on-state, and starts and continues the EPS control until the ignition switch is turned off,
   when the ignition switch is turned off and turned on again before the predetermined delay time has elapsed, the process restarts the EPS control, and
   when the ignition switch stays turned off longer than the predetermined delay time, the processor switches the power relay and the motor relay to the off-state and carries out the diagnosis of the power supply circuit, the power supply relay, and the motor relay.

* * * * *